US006240823B1

(12) United States Patent
Judge

(10) Patent No.: US 6,240,823 B1
(45) Date of Patent: *Jun. 5, 2001

(54) SHEET MATERIAL CUTTING SYSTEM

(76) Inventor: Stephen J. Judge, P.O. Box 51744, Pacific Grove, CA (US) 93950

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,116

(22) Filed: Nov. 24, 1998

(51) Int. Cl.[7] .......... B23Q 3/00

(52) U.S. Cl. .......... 83/574; 83/468; 269/295; 269/307

(58) Field of Search .......... 83/574, 468; 269/295, 269/289 R, 302.1, 307

(56) References Cited

U.S. PATENT DOCUMENTS

| | | | | |
|---|---|---|---|---|
| 418,961 | * | 1/1890 | Pressley et al. | 83/468 |
| 476,481 | * | 6/1892 | Newcomb | 269/307 |
| 514,096 | * | 2/1894 | Sheffield | 269/295 |
| 765,083 | * | 7/1904 | Knittel | 269/307 |
| 1,172,127 | * | 2/1916 | Fritch | 83/468 |
| 1,506,368 | * | 8/1924 | Fancher | 269/295 |
| 2,378,249 | * | 6/1945 | Ruth | 83/520 |
| 4,116,426 | * | 9/1978 | Kessler | 269/307 |
| 4,192,494 | * | 3/1980 | Mima | 269/289 R |
| 4,497,477 | * | 2/1985 | Abel | 269/303 |
| 4,582,305 | * | 4/1986 | Brothers | 269/307 |
| 4,799,680 | * | 1/1989 | Weimar | 273/157 R |
| 5,386,654 | * | 2/1995 | Kroenke | 269/307 |
| 5,386,978 | * | 2/1995 | Ladwig | 269/289 R |
| 5,487,536 | * | 1/1996 | McEachin | 269/295 |
| 5,560,297 | * | 10/1996 | Ford | 101/486 |
| 5,865,928 | * | 2/1999 | Lariviere, Jr. et al. | 156/256 |

* cited by examiner

*Primary Examiner*—Kenneth E. Peterson
*Assistant Examiner*—Stephen Choi
(74) *Attorney, Agent, or Firm*—Lariviere, Grubman & Payne, LLP

(57) ABSTRACT

The sheet material cutting system includes a cutting board having a reference corner with its two edges at a right angle with respect to each other. Cutting grooves are formed in the cutting board through the top layer thereof to expose a different colored layer for groove visibility. The grooves are positioned at known distances from the reference corner. The reference corner carries stops so that, when a sheet of colored transparent material is placed against the stops, the grooves can be used to guide a knife for cutting a square piece of colored transparent material for use in color frames in stage and similar lighting systems.

7 Claims, 4 Drawing Sheets

SHEET MATERIAL CUTTING SYSTEM

TECHNICAL FIELD

The present invention relates to a cutting board that permits untrained and unsupervised workers to efficiently cut transparent plastic sheets for subsequent use in stage lighting applications.

BACKGROUND ART

Lighting instruments are used to illuminate performers of live theater, dance, musicals, and in the production of television and movie programs. In addition, colored lighting is employed in various locations for calling attention to a certain area for the creation of mood or style. To produce colored lighting, a colored transparent lens is positioned in a so-called "color frame", and the color frame then juxtaposed with the light.

Historically, colored transparent material was supplied in sheets, referred to as gel, that were sliced from blocks of colored gelatin, and the sheets were then cut as appropriate to shape the material for the desired lens size and shape. Colored synthetic polymer composition material has replaced sheets of gel and is often referred to as "color." In this disclosure, that kind of material will be referred to as "colored transparent material".

The colored transparent material, once cut to size to establish a lens, is placed in a color frame for use in a lighting instrument. The type of lighting instrument in which the colored transparent material is used usually consists of a light bulb or other light source, a reflector, means for focusing the light output, and a slot to hold the color frame.

Unfortunately, existing methods for cutting the sheets to size are both inaccurate and inefficient, particularly when undertaken by unskilled cutting people who consequently require supervision to ensure that the correct size pieces are accurately cut with a minimum of material wastage. As examples of existing methods of cutting the sheets to size and shape, specific color frame (i.e., lens) dimensions are first obtained to determine the desired size. The colored transparent material can be put on a paper cutter, but such are heavy, expensive, and awkward to use, especially in the sizes required to handle larger sheets of colored transparent material. In addition, paper cutters provide no more information than a ruler at one edge and a cutting blade at a right angle with respect thereto. Consequently, when using a paper cutter, over-cutting is common, and material is wasted as a result. Moreover, with a paper cutter, the blades can become dull, causing the colored transparent material to be dragged off the cutting surface without being cut. If two cuts are to be made, the sheet of colored transparent material must be turned over and rotated to be lined up with the correct measurement in order to make the second cut.

Another method is to use the lens color frame (or one of the same size and shape) as a cutting guide, but when the color frame itself is used as a cutting guide, the result is an over-sized piece of colored transparent material. Furthermore, the upper corners of the color frames are normally cut off at an angle so that a rectangular piece of colored transparent material will extend upward as a portion to grasp to remove the colored transparent material. When the color frame is used as a guide, the user tends to cut along those angled corners to thereby defeat the purpose of the cut angle corners on the frame. The alternative is to cut the corners by free-hand. When using the color frame as a guide for cutting the colored transparent material, all sizes of color frames must be available to result in the need for extra frames.

Yet another way to cut the colored transparent material to fit the color frame is to place the colored transparent material on a smooth cutting surface. A straight edge is used in conjunction with a measuring scale. This is a time-consuming procedure and results in cutting or scratching the smooth cutting surface. Furthermore, the smooth cutting surface gives no cutting information to the user, thus requiring a skilled or supervised worker.

In any case, it is to be appreciated that all of the above-mentioned methods for cutting plastic sheets for various types of lights tend to be time-consuming and tend to produce inaccurately sized light covers, particularly when undertaken by unskilled people. As recognized by the present invention, it is desirable to enable an unskilled person to cut the material while avoiding the need for close supervision, which is otherwise time consuming and inefficient.

SUMMARY OF INVENTION

The present invention overcomes the above-noted problems by providing a system and method for cutting color plastic sheets for lighting applications that permits an unskilled worker to accurately and efficiently cut the sheets into predetermined shapes and sizes with a minimum of sheet wastage and with little or no supervision.

In order to aid in the understanding of this invention, it can be stated in essentially summary form that it is directed to a sheet material cutting system which includes a cutting surface having a reference right angle corner. The corner carries stops extending above the cutting surface that easily and properly register sheets of plastic on the cutting board, so that an unskilled worker can easily and properly position a sheet on the board. Grooves are formed in the surface in particular reference position with respect to the reference corner in order to serve as visual and physical knife guides. The grooves are positioned to result in cut material of a predetermined size. It is particularly intended that the sheet material cutting system be used for the cutting of colored transparent material useful in color frames in lighting systems. To aid a worker in accurate and efficient cutting, written indicia are provided on the board that indicate what grooves are to be used for what type of lens, how large the lens will be, and how many pieces of that particular lens can be cut from a standard sized plastic sheet.

Other features of the present invention are disclosed or apparent in the section entitled "Best Mode for Carrying Out the Invention."

Figure 1:
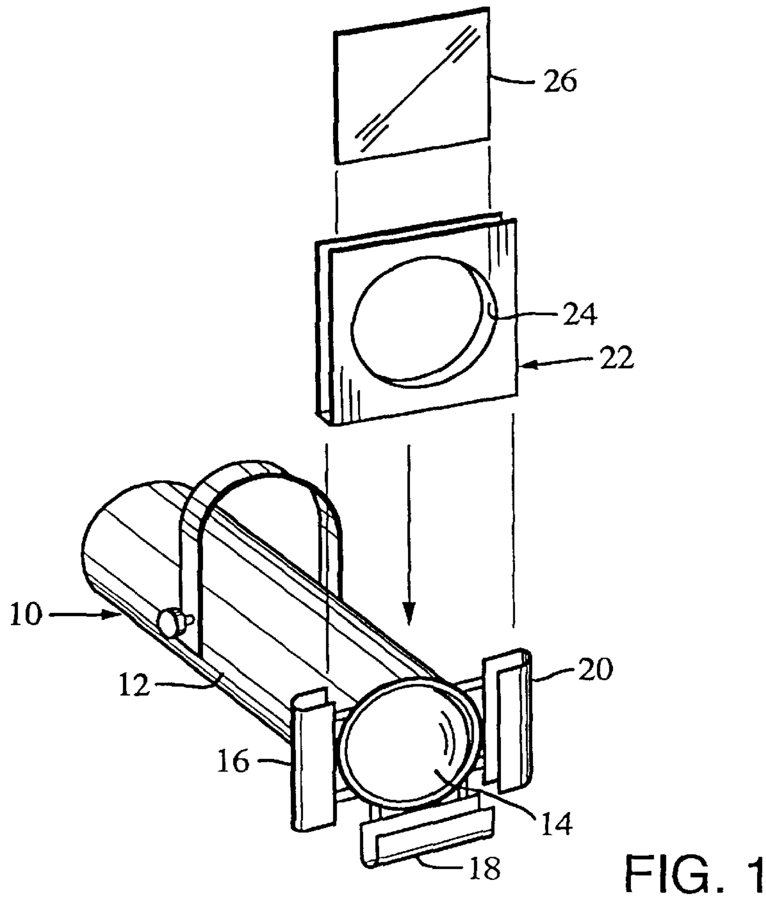
FIG. 1 is an exploded view of a lighting instrument which employs colored transparent material which can be cut in accordance with the system of this invention.

Reference numbers refer to the same or equivalent parts of the present invention throughout the several figures of the drawing.

BEST MODE FOR CARRYING OUT THE INVENTION

Lighting fixture 10 shown in FIG. 1 has a body 12 which contains a lamp and reflector to direct most of the light out of lens 14 so that it can be directed to the area to be illuminated. The front of the body 12 carries guides 16, 18 and 20, which are U-shaped guides. These guides may be made in one piece rather than the three pieces shown. Guides are sized to receive color frame 22. Color frame 22 has an opening 24 therethrough preferably the size of the lens 14 so that light is not obstructed. The color frame receives colored transparent material 26 therein. The color frame 22 may be closed on its sides or may be open side U-shaped, as indicated. The colored transparent material 26 is inserted into the color frame 22 to establish a color lens, and the color frame is inserted into the guides on the lighting fixture. The color selected for the material 26 determines the color of the light from the lighting fixture directed to the desired area.

It is to the system for cutting the colored transparent material to which this invention is directed. The sheet material cutting system includes a cutting board 30, which has a hard, flat top surface 32 over a substantial part of its area. The cutting board 30 is formed of a base layer 34 (see FIG. 4) and a top layer 36, which carries the smooth top surface 32. The base layer is strong and substantially rigid to give strength and body to the cutting board. The base layer is preferably made of a dark colored material, such as black material. The top layer 36 is a white layer of hard, synthetic polymer composition material which is resistant to scratching. The cutting board 30 is rectangular and is preferably 20"×24" (51×61 cm) in size, which is the same size as a standard sheet of colored transparent material.

Figure 4:
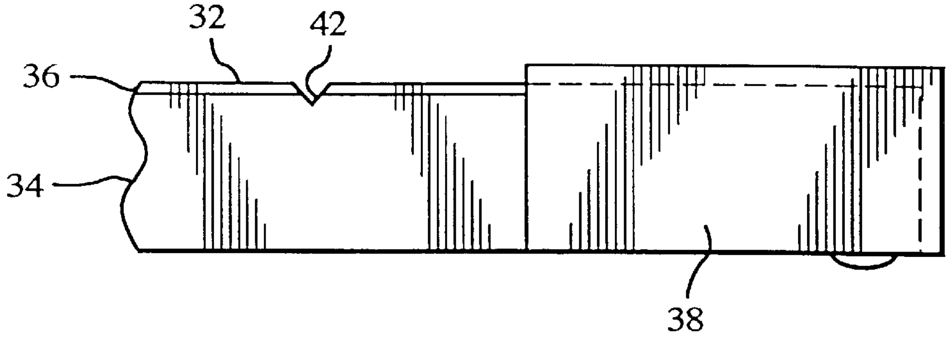
FIG. 4 is an enlarged edge view thereof.

The lower right corner carries stop edges 38 and 40, which extend slightly above the surface 32, as is seen in FIG. 4. The interior stop surface of the stop edge is in line with the adjacent exterior edge of the cutting board. The stop edges extend sufficiently above the top surface 32 so that a sheet of colored transparent material may rest thereagainst to position the sheet of colored material with its corner exactly at the reference corner of the cutting board. Thus, the stop edges 38, 40 are registration elements that serve to properly position a standard size sheet of material on the cutting board 30.

Figure 2:
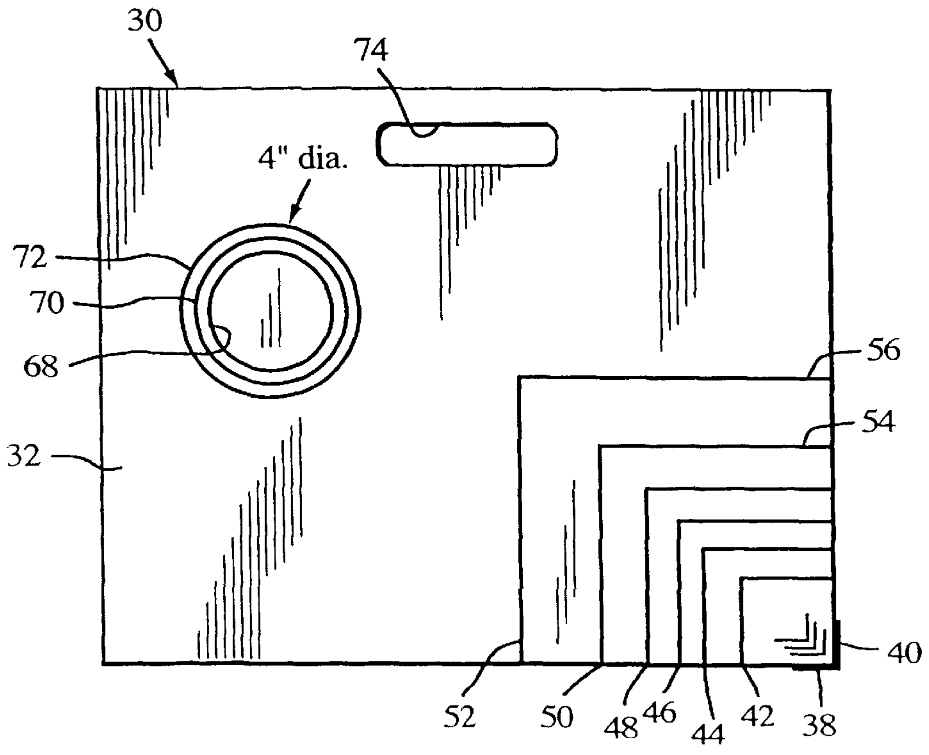
FIG. 2 is a plan view of the cutting board of the cutting system of this invention.
Figure 5:
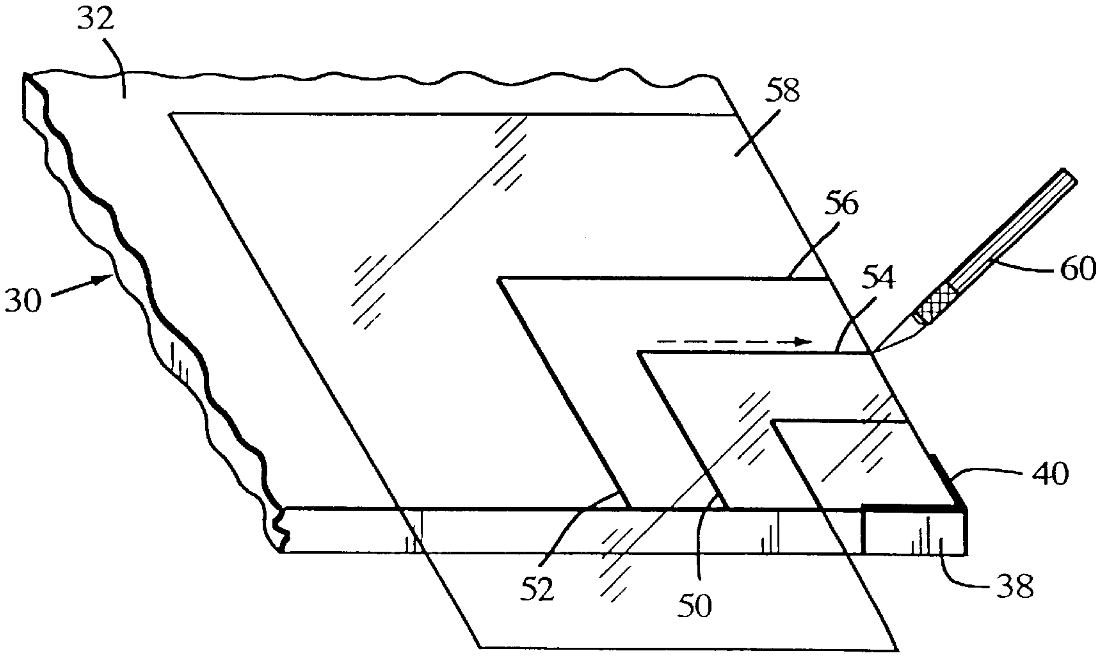
FIG. 5 is an isometric view showing colored transparent material being cut on the cutting board.

Cutting notches are cut into the top surface of the board to form grooves which are visible and which are sufficiently deep to serve as a guide for a cutting knife. As seen in FIG. 4, the cutting groove 42 is shown as being cut through the top layer 36 to expose a portion of the dark colored base layer 34 to thus present a visible groove. The top layer is preferably white so that the color of the colored transparent material may be evaluated easily. The grooves 42, 44, 46, 48, 50 and 52 are spaced from the stop 40 respectively at 3 inches, 4 inches, 5 inches, 6 inches, 7½ inches, and 10 inches. These are standard sizes of colored transparent material for utilization in standard color frames. For convenience, only two of these cutting grooves are shown in FIG. 5. The thus described cutting grooves are parallel to the right-hand edge of the cutting board, as seen in FIG. 2. A series of companion cutting grooves are spaced the same dimension upward from the interior of stop edge 38 as the previously described cutting grooves to define square outlines. The companion cutting grooves 54 and 56 are shown in FIG. 5 as companions to the cutting grooves 50 and 52 to thus define squares with respect to the reference corner.

It should be clearly understood that the grooves 42, 44, 46, 48, 50 and 52 are by way of example only, and that in any final product the grooves would correspond with existing color frames. A final product in accordance with the principles of the present invention would include grooves corresponding to as many existing color frames as possible.

In use, a full sheet of colored transparent material or a partially used sheet thereof, such as a partially used sheet 58 shown in FIG. S is provided. This step is indicated at block 100 in FIG. 6. As indicated at block 102 in FIG. 6 and as shown in FIG. 5, the sheet of colored transparent material 58 is placed with one of its exterior corners, e.g., the lower right corner, against the stops, and with one of its edges at the edge of the cutting board. In FIG. 5, the right edge of the sheet is in line with the right edge of the cutting board.

Figure 6:
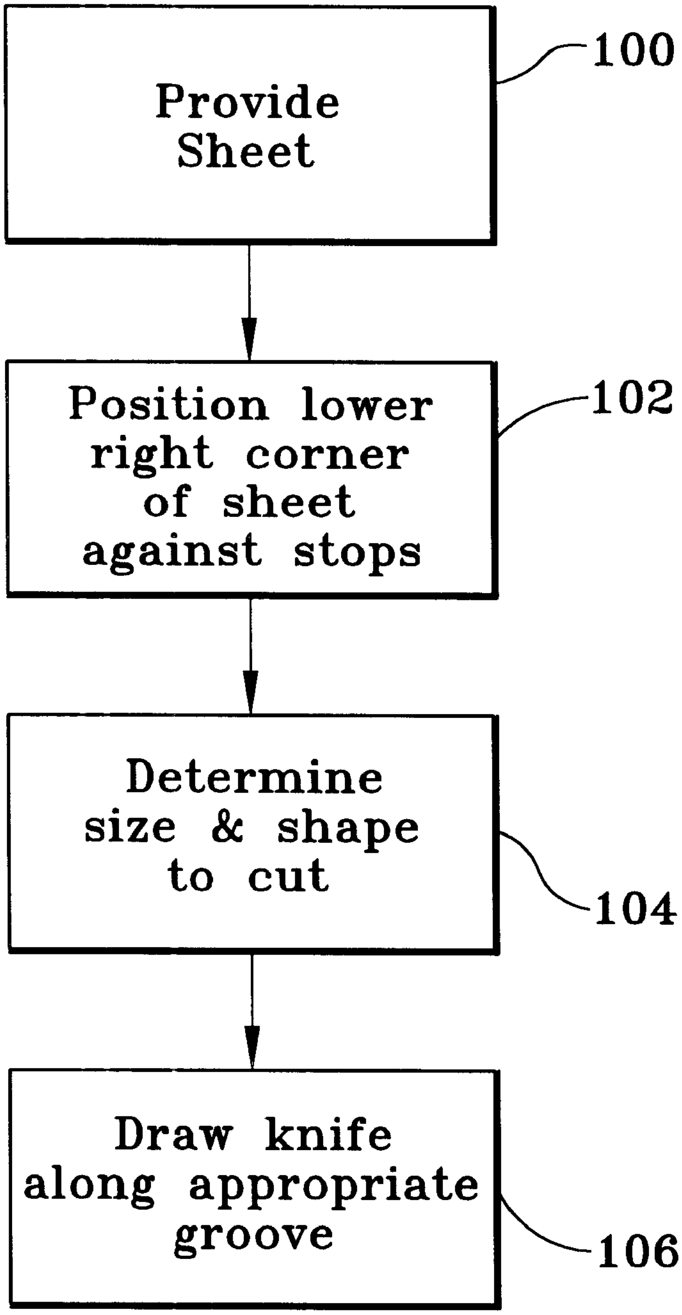
FIG. 6 is a flow chart of the present method steps.

Moving to block 104 of FIG. 6 and in continued reference to FIG. 5, the user determines (or is told) what size and shape color lens is to be cut. For example, the user might want to cut a portion of the colored sheet material 58 to be 7½ inches square. Under these circumstances, at block 106 of FIG. 6 the user draws his knife 60 through the grooves 50 and 54 and also along the lower edge of the board from the groove 50 to the right to, thus, cut out the square sheet of colored transparent material. In this way, squares of standard size can be accurately and efficiently cut, even by an unskilled worker, with two or three strokes of the knife 60. The knife 60 may be any having a sharp blade, such as a matte knife or other commonly available knives with replaceable blades.

Figure 3:
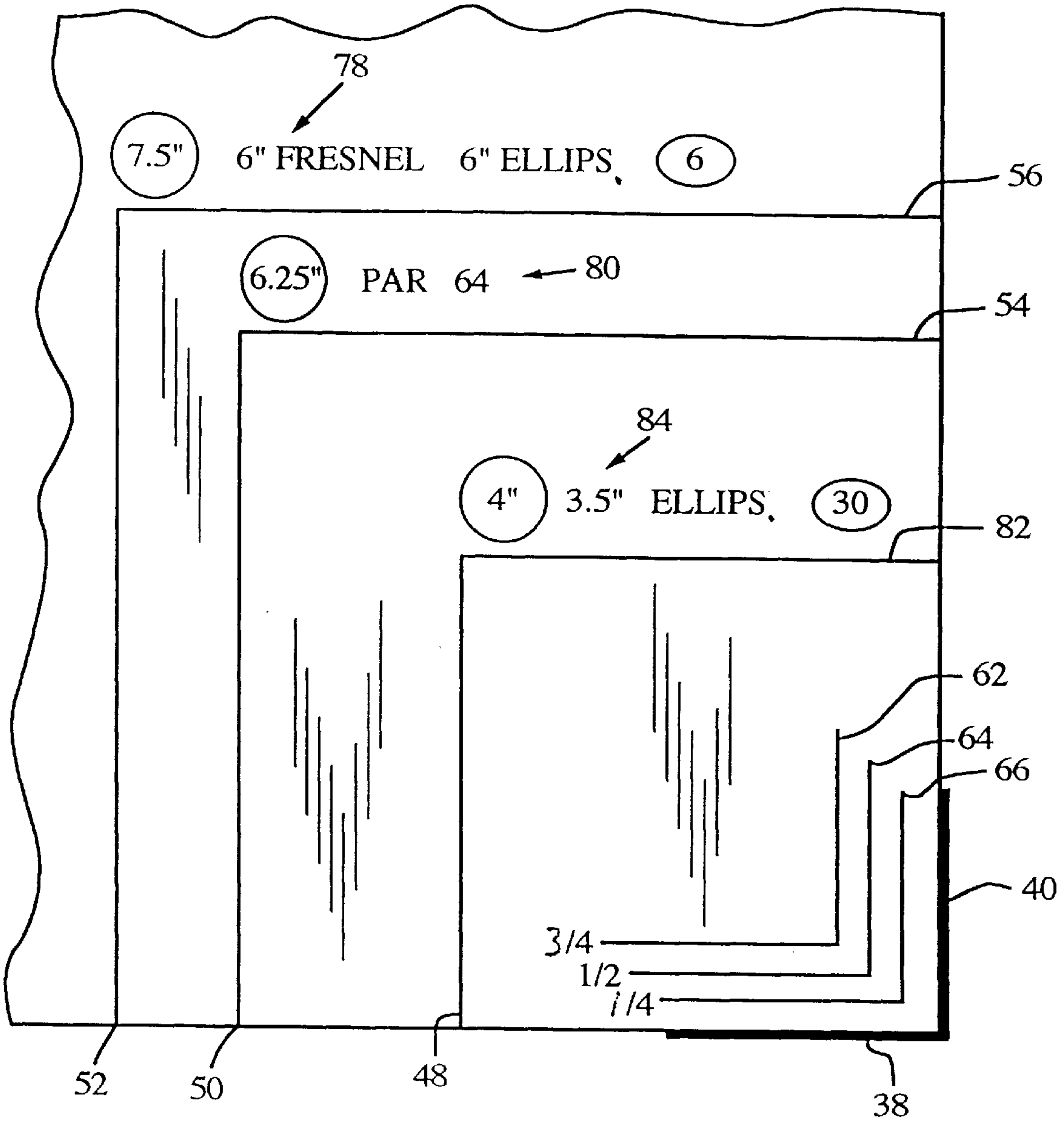
FIG. 3 is an enlarged view of the lower right-hand corner of FIG. 2.

To aid the user in knowing which grooves to use at block 106, alpha-numeric indicia are provided on the cutting board 30 as follows. Referring briefly back to FIG. 3, indicia 78 include the writing "7.5" 6" FRESNEL 6" ELLIPS. 6". The initial 7.5" is in a circle, and the final 6" is in an ellipse. The initial number is the frame size into which a square of color will fit when cut to the size of these rectangular cutting grooves. The second and third bits of indicia indicate the types of lighting instruments that this piece will fit, in this case a 6" fresnel light or a 6" ellipsoidal light. The final bit of data in this line indicates that six pieces of color of this size can be cut from a standard sheet of colored transparent material, so that even an unskilled user can readily understand how to optimize use of the sheet to minimize wastage.

Further indicia are preferably provided. For example, on the cutting groove 54, the indicia 80 is "6.25" PAR 64". This means that cutting on these grooves is for a 6.25 inch frame and is for a PAR 64 light. On the cutting groove 82, which joins cutting groove 48, there is indicia 84. The indicia 84 is "4" 3.5" ELLIPS. 30".

This means that a square of color cut on the lines 48 and 82 will fit a 4" frame on a 3.5" ellipsoidal light, and 30 pieces can be cut from a standard sheet of color.

Sometimes it is desirable that the cut piece of colored transparent material be another size than one of the indicated standard sizes. To aid in achieving these nonstandard sizes, V-shaped grooves 62, 64 and 66 are provided adjacent the stops 38 and 40, particularly see FIG. 4. The grooves 62, 64 and 66 are V-shaped both in cross section and in plan view where each has two arms, which are 90 degrees with respect to each other and which are parallel to the stops 38 and 40. The groove 62 is positioned ¾ inch away from stops 38 and 40; the groove 64 is positioned ½ inch away from stops 38 and 40; and the groove 36 is positioned ¼ inch away from stops 38 and 40. Indicia 76 shows these dimensions. With these grooves positioned in that way, instead of the sheet to be cut being positioned against the stops 38 and 40, the corner of the sheet to be cut is positioned on one of these grooves. If a ¼ inch undersized cut piece of colored transparent material is desired, its lower right corner is positioned on the groove 66, and the cutting is done on one of the selected cutting grooves. The grooves 62, 64 and 66 are only position reference grooves. It is not anticipated they will be used in cutting. In this way, square sheets of preselected sizes of colored transparent material can be readily and quickly made to save time and material.

As recognized by the present invention, some spotlights require round pieces of colored transparent material. Accordingly, three circular grooves 68, 70 and 72 are cut through the top layer 36 in the same manner as groove 42, as shown in FIG. 4. The circular grooves are concentric and are away from the cutting grooves configured for the cutting of square pieces of colored transparent material. The cutting board has an opening 74 therethrough adjacent its top edge to serve as a carrying handle for the cutting board. FIG. 2 shows the indicia "4" dia." to indicate that this circle is used to cut a circular piece of color with this guide. The other circular guide grooves 68 and 70 are a known smaller diameter.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A sheet material cutting system usable by untrained and unsupervised workers for accurately and efficiently cutting colored transparent material to a size to dimensionally fit a color frame of a lighting fixture for subsequent use in stage lighting applications, said cutting system comprising:

a cutting board, said cutting board being rectangular and having first and second edges positioned at a right angle with respect to each other, said cutting board being formed of a base layer and a top layer, said top layer being formed of white material for visual color examination of colored transparent material placed thereon and said base layer being made of material which contrasts in color with said top layer;

first and second stops secured to said first and second edges of said cutting board, said stops extending above said cutting board so that a sheet of colored transparent material can be placed on said board and against said stops;

grooves in said board extending down through said top layer of said board to expose said base layer to make said grooves visible because of the contrast in color between said layers, said grooves being pairs of grooves with one groove of each pair being respectively parallel to said first and second edges of said cutting board, said pairs of grooves being spaced predetermined distances from said first and second edges so that when a sheet of transparent material is placed on said cutting board and against said stops, said colored transparent material can be cut with a knife guided by the selected groove to cut a selected portion of the colored transparent material to a size to dimensionally fit a color frame of a lighting fixture;

visible alpha-numeric indicia provided on said cutting board, said indicia indicating what grooves are to be used for what type of lens, how large the lens will be, and how many pieces for that particular lens can be cut from a standard sized sheet of colored transparent material.

2. The sheet material cutting system of claim 1 wherein said pairs of grooves are respectively equidistant from said first and second edges to define squares with respect to said first and second edges.

3. The sheet material cutting system of claim 2 wherein said grooves are continuous V-shaped grooves for the physical guidance of a knife cutting the colored transparent material.

4. The sheet material cutting system of claim 1 wherein there are also circular grooves through said top layer of said cutting board for the cutting of circular pieces from the sheet of colored transparent material.

5. The sheet material cutting system of claim 1 wherein there is an opening through said cutting board adjacent one edge thereof to serve as a handle for carrying said cutting board.

6. The sheet material cutting system of claim 1 wherein there is at least one pair of grooves adjacent said stops, said additional pair of grooves serving as a pair of visual stops for positioning a sheet of colored transparent material away from said stops so that when the colored transparent material is cut at one selected pair of visual stop grooves it is smaller than when the colored transparent material is against said stops.

7. The sheet material cutting system of claim 6 wherein there is a plurality of pairs of additional grooves spaced from each other and spaced from said stops to serve as selectable visual corner positioning stop grooves for the selected under-size cutting of a piece from a sheet of colored transparent material.

* * * * *

UNITED STATES PATENT AND TRADEMARK OFFICE

CERTIFICATE OF CORRECTION

PATENT NO. : 6,240,823 B1
DATED : June 5, 2001
INVENTOR(S) : Stephen J. Judge

It is certified that error appears in the above-identified patent and that said Letters Patent is hereby corrected as shown below:

Column 4,
Line 1, after the word "FIG." delete the letter [S] replace with the number -- 5 --.

Signed and Sealed this

Thirtieth Day of October, 2001

*Attest:*

Nicholas P. Godici

NICHOLAS P. GODICI

*Attesting Officer* *Acting Director of the United States Patent and Trademark Office*